United States Patent Office 3,185,576
Patented May 25, 1965

3,185,576
PROCESS OF PREPARING STABILIZED
JELLY FILLING
Harold M. Ross, 27 Glennwood Road,
South Orange, N.J.
No Drawing. Filed Aug. 30, 1961, Ser. No. 134,842
1 Claim. (Cl. 99—129)

My invention relates generally to stabilized jelly fillings, and particularly to a stabilized jelly filling for cakes and cookies, which jelly filling is non-liquefiable during agitation and extrusion as a filling of cakes and cookies and the like.

It is among the objects of my invention to provide a stabilized jelly filling which maintains its jelly consistency during extrusion filling.

It is a further object of my invention to provide a stabilized jelly filling which does not turn to a fluid state during extrusion filling of cakes and cookies.

A further object of my invention is to provide a stabilized jelly filling for cakes and cookies that has an appetizing quality.

Yet a further object of my invention is to provide a stabilized jelly filling whose ingredients do not impair or modify the flavoring material in the jelly, whether natural or synthetic, but rather enhances the flavor.

Among the further objects of my invention is to provide a stabilized jelly filling that maintains its consistency during all stages of processing, and does not change its form substantially under variable conditions of temperature and pressure.

These objects and advantages as well as other objects and advantages are attained by the hereinafter set forth materials and steps of which the following is a specification.

Reasonably priced cakes and cookies of high quality and taste appeal are now available to the public through modern processing methods, involving mixing of ingredients, baking, and applying fillings. Numerous fillings having both synthetic and natural flavors are available for cakes and cookies and similar products, including candies and other types of confections, but these fillings are not readily adaptable to high speed mechanisms that fill cakes and cookies and similar items, by extrusion. Fillings must be prepared which have a certain consistency and will maintain a somewhat gelatinous state when applied to baked goods. Numerous filling agents that function as addition agents to jellies are well known and are available for preparing jelly fillings and when jellies are so prepared, they may be manually applied as fillings for cakes, cookies and the like. They remain relatively stable in their consistency after so being applied.

However, when these compositions are applied by high speed extrusion mechanisms for the purpose of filling cakes and cookies, these fillings when prepared in the ordinary way with ordinary stabilizing agents become unstable; after or during extrusion, the jell-like consistency disappears, and the material acquires a fluid-like consistency, and runs out of the cake or cookies, completely destroying its marketability. The use of numerous stabilizing agents that impart a jell-like consistency to fillings invariably discloses that upon extrusion, the jell-like state is converted into a fluid state.

A composition in the form of a stabilized jelly filling has been discovered, which will resist liquefaction during mixing and extrusion. This composition included pectin, sodium alginate and calcium gluconate. Gluconic acid is an extremely mild organic acid which does not react with metal, plastic or glass equipment except very slightly with iron, steel, and aluminum. Its salts have practically no reaction with the aforesaid metals. This is particularly true of calcium gluconate ($C_{12}H_{22}CaO_{14}$) and, therefore, it is an ideal agent for the preparation of a stabilized jelly filling. It is odorless and tasteless and stable in the air. As a powder, it is readily soluble in water, in the concentrations required in the present composition. If higher concentrations are required, they can be prepared by using calcium D-saccharate as a stabilizer.

Alginic acid $(C_6H_8O_6)_n$ forms a number of metallic salts of which sodium and calcium alginate are typical. In aqueous solutions, sodium alginate forms a colloidal suspension. Pectin is a water soluble methyl ester of pectic acid that forms a jell with sugar and a weak acid. A low-methoxyl pectin is preferred in the present composition. Pectin is a carbohydrate obtained from dilute acid extract of the inner portion of the rind of citrus fruits. It consists chiefly of partially methoxylated polygalacturonic acids. The presence of methoxyl groups is somewhat variable and it is preferred that no more than seven percent methoxyl groups be present when calculated on moisture and ash-free basis. Since both the pectinaceous materials and the alginaceous materials do not contribute a high jelling property unless there is a mild acidification, citric acid is utilized as an acidifying agent to adjust the pH of the composition to approximately 3.5 to 3.6.

An example of the stabilized jelly filling suitable for extrusion as a filling for cakes, cookies, and the like, is as follows:

Example (1) An aqueous sugar solution is prepared by dissolving 495 pounds of sugar (sucrose) in 165 pounds of water.

(2) Seven and one-half pounds of low methoxyl pectin is added to and dissolved in the sugar solution.

(3) One hundred and sixteen pounds of water is then added and the result is a viscous mass.

(4) Flavor and color is added to taste.

(5) To this mixture, 39 ounces of high viscosity solid sodium alginate is added, and in addition, 39 ounces of low viscosity sodium alginate is added. Agitation is continued until the alginates are completely dissolved.

(6) The temperature of the mass is then raised to 170° F. and it is maintained at that temperature for 30 minutes.

(7) An aqueous solution of calcium gluconate is then prepared, consisting of 39 ounces of powdered calcium gluconate and one-half gallon of water; this is added to the previous mixture.

(8) The entire mixture is agitated. Mere convection has been found not to be sufficient to bring about a stabilized jelly-filling; the mixture should be agitated by drawing from the bottom of the mix and pumping the effluent into the top portion of the mix so that there is complete motion and dispersion of the calcium gluconate, until a homogeneous jelled mass is attained.

(9) When a homogeneous mixture is attained, then 39 ounces of citric acid is added. A concentrated aqueous solution of citric acid is used, and the mixing proceeds as aforesaid, until acidification has proceeded to such an extent as to adjust the pH of the mixture of approximately 3.5 or 3.6.

(10) The mixture is then discharged into storage or shipping containers and is allowed to stand and cool to approximately 70° F.

When this material is supplied to a cookie or cake filling machine and is extruded to fill cakes or cookies, the mix retains its gel-like consistency after extrusion; it is stabilized and does not liquify.

The sequence of addition of ingredients is critical, particularly with respect to the citric acid; if substantially varied the resultant gel will not have the desired consistency, and it will liquify when extruded.

The stabilized viscosity of the gel produced by the example is:

On a penitrometer, 250 bloom.

On a jelometer, it exceeds 70,000 dynes per square centimeter.

The quantitative presence of the various ingredients may be varied in order to obtain a stabilized jelly filler of varying consistency, in accordance with the taste or desire of the one using the composition. Thus, a stabilized jelly filler can be prepared which has a relatively soft moldable consistency, or one can be prepared whose consistency approaches a very firm jelly-like texture. These variations are contemplated as being within the scope of the appended claim.

What is claimed is:

The method of preparing a stabilized jelly filling comprising:

(a) dissolving sucrose in water in proportions of approximately 495 pounds of sucrose to 165 pounds of water, (b) dissolving aproximately 7½ pounds of low methoxyl pectin in the sugar solution, (c) adding approximately 116 pounds of water to the resultant product, (d) dissolving therein approximately 39 ounces of high viscosity solid sodium alginate and 39 ounces of low viscosity sodium alginate, (e) heating the product to approximately 170° F. for approximately 30 minutes, (f) adding thereto an aqueous solution of approximately 39 ounces of powdered calcium gluconate in one-half gallon of water, (g) thoroughly mixing the product until a homogeneous mass is attained, and (h) mixing citric acid into the homogeneous mass to adjust the pH to approximately 3.5.

References Cited by the Examiner

UNITED STATES PATENTS

| | | | |
|---|---|---|---|
| 1,913,576 | 6/33 | Walsh | 99—131 |
| 2,233,574 | 3/41 | Baker et al. | 99—132 |
| 2,992,925 | 7/61 | Green et al. | 99—131 |

OTHER REFERENCES

Kertesz: "The Pectic Substances," 1951, pp. 198, 199, 514, 534, 535, Interscience Publishers Inc., New York.

A. LOUIS MONACELL, *Primary Examiner.*

BEATRICE H. STRIZAK, *Examiner.*